United States Patent Office 3,544,369
Patented Dec. 1, 1970

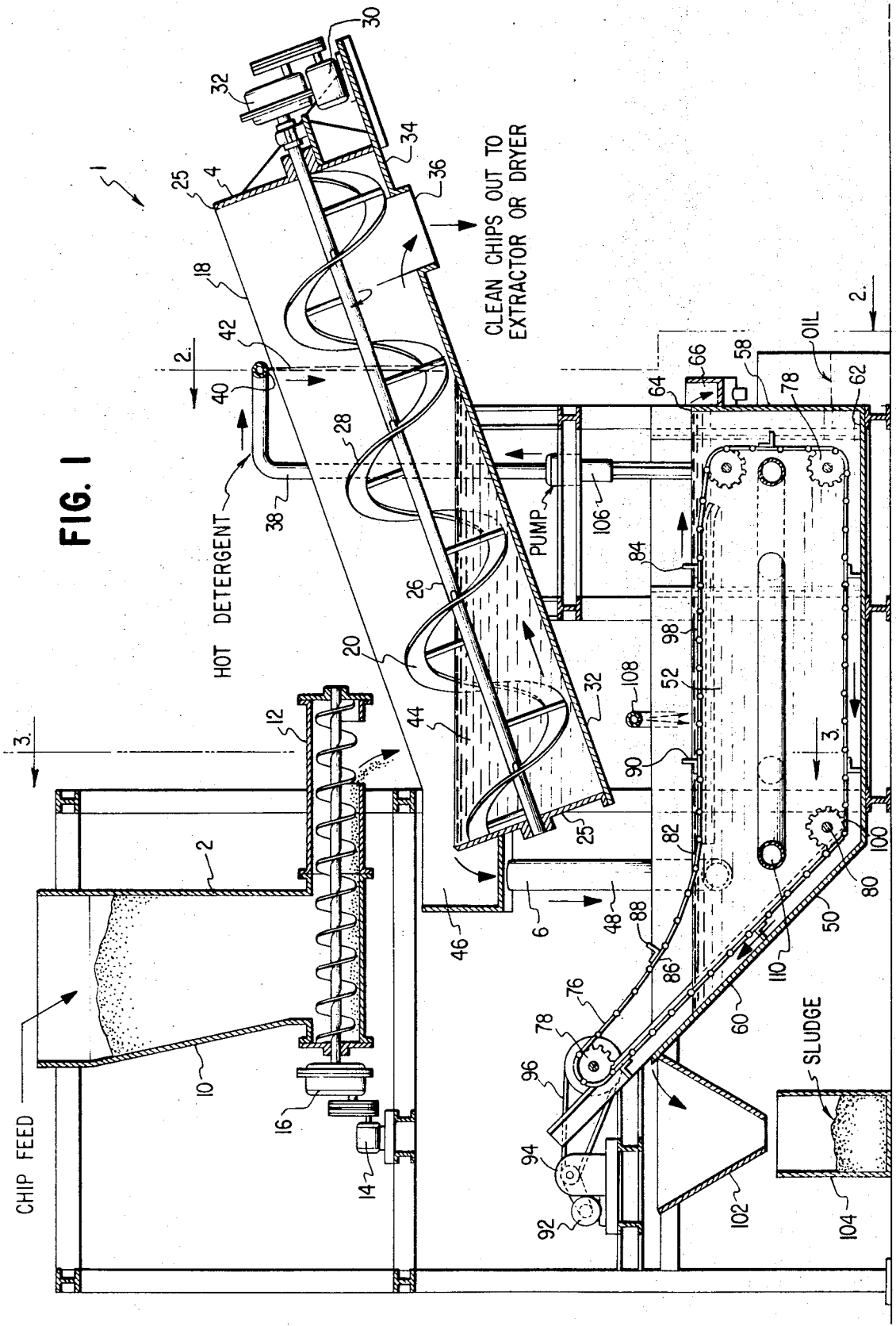

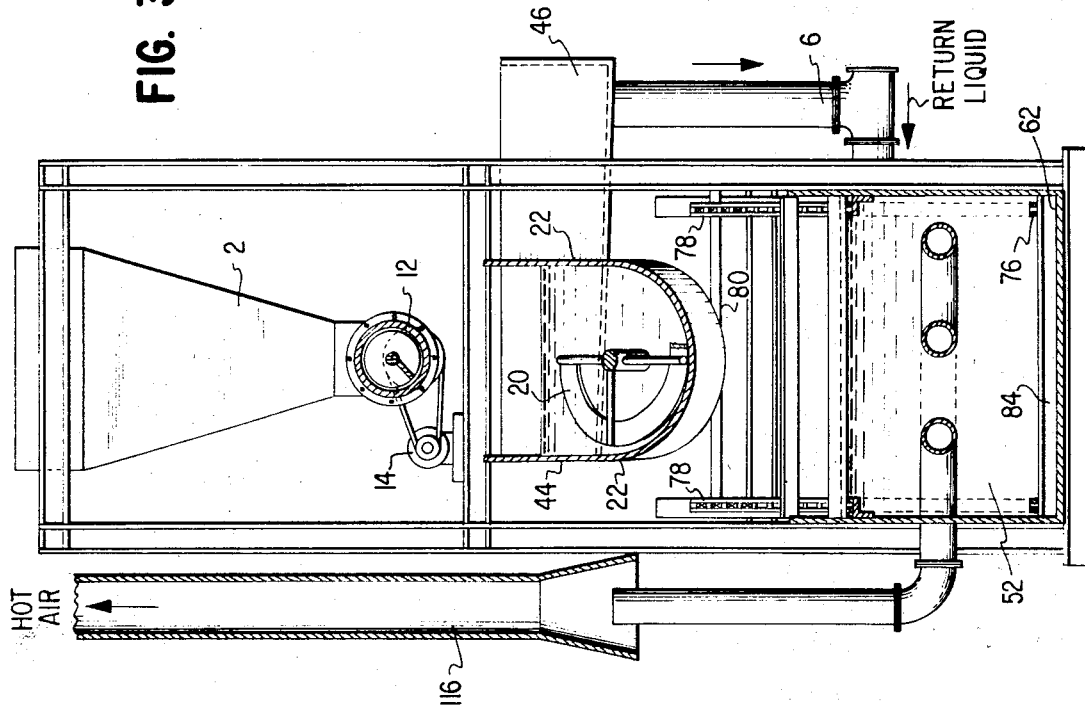
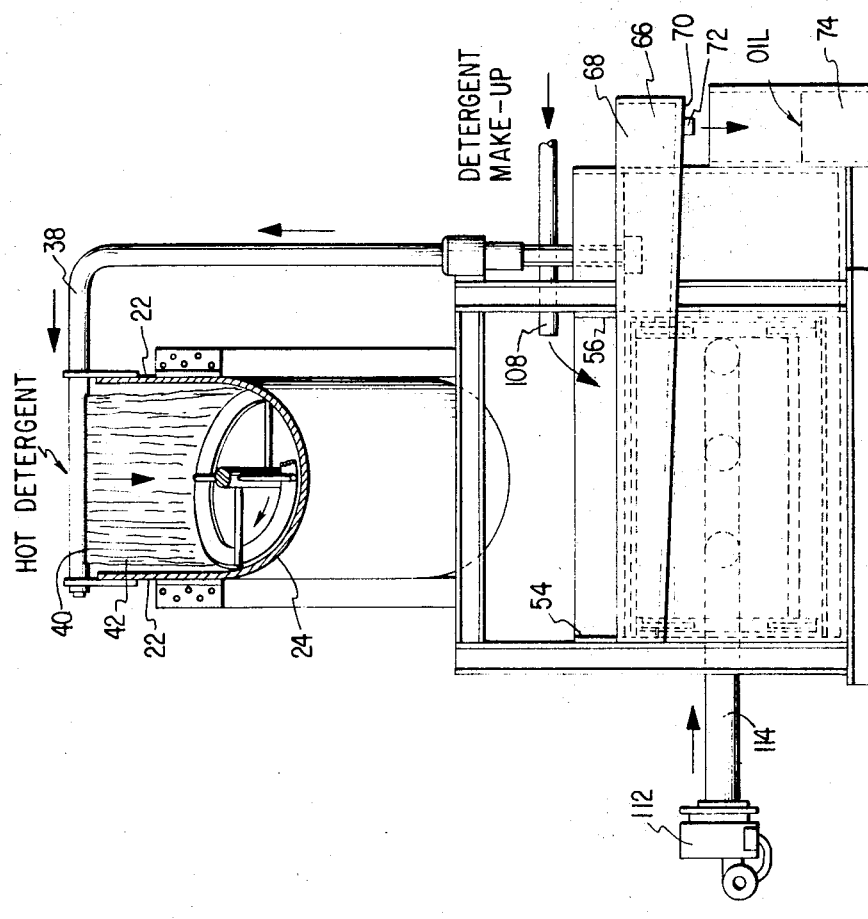

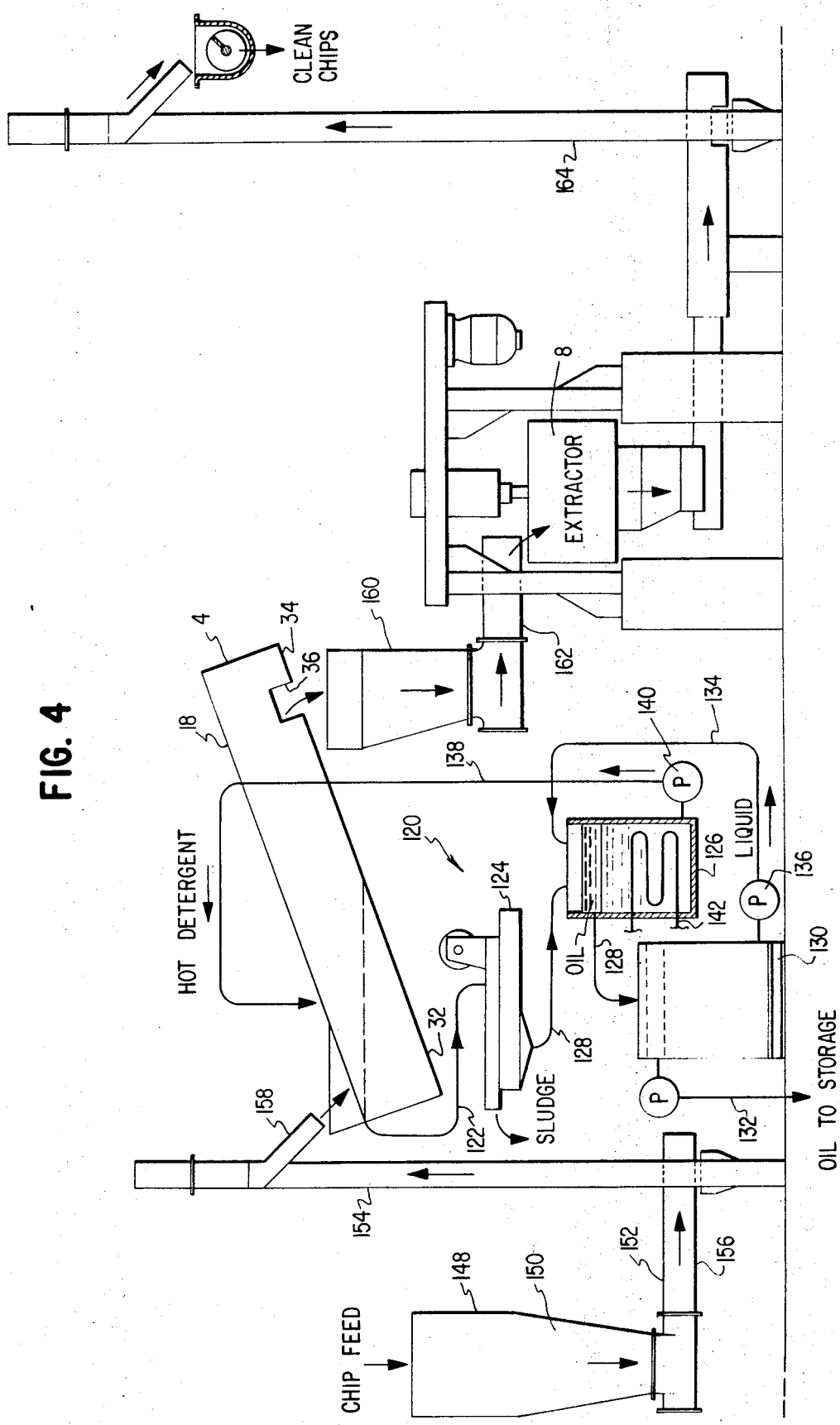

3,544,369
METHOD FOR THE CLEANING OF METAL WASTE AND THE RECOVERY OF OIL THEREFROM
James R. Keogh, Jr., Philadelphia, Pa., assignor to FMC Corporation, a corporation of Delaware
Filed Dec. 26, 1967, Ser. No. 693,298
Int. Cl. B08b 3/08; C23g 1/36
U.S. Cl. 134—25
8 Claims

ABSTRACT OF THE DISCLOSURE

A method and apparatus for the removal of oil and other impurities from metal waste such as metal turnings, chips and the like and the reclamation of lubricating oils from said waste. The waste is moved countercurrent to an oil-dissolving detergent solution, the waste being agitated. The used detergent solution is purified by settling and standing, removing sludge and upper oil phase, and is then recirculated after adding make-up detergent thereto.

BACKGROUND OF THE INVENTION

Field of the invention

This invention relates to a method and apparatus for cleaning metal waste such as metal chips or turnings and reclaiming lubricating oil from said waste and more particularly to a method and apparatus for washing such metal waste, reclaiming oil from the wash solution and drying the waste to provide a commercially acceptable metal waste product of low moisture and oil content which may be fed directly to melting furnaces or compressed into briquettes.

The state of the prior art

Daily, industry creates vast quantities of metal waste in the form of chips, turnings, borings and the like. This waste is usually comprised of a multitude of metal particles or pieces each coated with the lubricating oils associated with the drilling, cutting or boring operations producing such waste. In addition, other impurities of the type normally attendant industrial facilities are mixed with the metal waste. In handling industrial waste of this nature, it is extremely desirable to either compress the waste into briquettes or directly feed the waste to a melting furnace. In order to accomplish these ends, however, it is essential that a high percentage of the oil content of the waste be removed, preferably to a level of less than approximately 2% by weight oil and moisture content.

The prior art has failed to provide a method and apparatus for accomplishing the recovery of both the metal and the oil which operates on a profitable basis and will provide a waste of sufficiently low oil and moisture content for direct feeding to melting furnaces or compression into briquettes having desired compressive strengths.

Various of the prior art reclaiming operations are directed solely to the reclamation of either metal or oil and do not provide a combined operation from which the overall profit advantages are available. These and other attempts of the prior art to remove quantities of moisture and oil from metal chips and the like have been unsuccessful in producing an end product having a sufficiently low moisture and oil content that the waste may be formed into briquettes of such a high compressive strength as 10,000 pounds per square inch. Still other prior art reclaiming operations, in attempting to provide commercially acceptable end products, employ such complicated processes and apparatus as to substantially increase both the capital investment required and the operating and maintenance expenses attendant the process.

SUMMARY OF THE INVENTION

This invention encompasses a method and apparatus for automatic and continuous cleaning and drying of metal waste such as metal chips, turnings and the like and the reclamation of oil therefrom. The oils include those used both for cooling and lubricating and may be of various forms including oils in emulsions and other forms commonly used in boring, cutting and like operations.

The method of this invention broadly includes the steps of crushing the metal waste, washing the crushed waste with a detergent solution of sufficient strength to dissolve the oil carried by such waste, yet permit the rapid separation of the oil from the solution, drying the waste to remove moisture and remaining oil, and reclaiming the oil from the wash solution as the wash solution is recirculated in a continuous manner to, from, and through a metal waste wash bath. The washing step is accomplished by providing a flow of detergent solution in a first direction, agitating and moving the crushed metal waste through the flowing detergent solution in a direction generally opposite to the direction of flow of said solution providing a counterflow of waste and solution. The detergent solution is then passed through a recirculation circuit back to the wash bath for repeated passage through said bath. Within the recirculation circuit, sludge carried by said solution is removed, the detergent solution is heated to maintain the temperature of the solution at a desired level and the lubricating oils are separated from said solution. The waste is then removed from the wash bath and subjected to a drying operation wherein the moisture acquired during the bath and a portion of the remaining oil may be separated from the waste.

The new and novel apparatus comprising this invention includes the combination of a metal waste washer having a tank which defines a washing basin and means within the tank such as an inclined ribbon conveyor for moving the metal waste through the basin in a first direction while agitating the waste to expose all surfaces of the individual particles of the waste to the wash solution. This apparatus also includes a means operatively connected to the washer for supplying a flow of detergent wash solution through the tank in the direction opposite to the movement of the metal waste on a recirculatory basis. The detergent wash solution is fed into the tank opposite the metal waste input and moved through the tank in a counter flow manner to the movement of the waste. The solution flows from the tank and through a recirculation means or circuit. The recirculation means includes means for separating from the detergent solution both sludge and oil as for instance a settling basin wherein the sluge, oil or detergent solution components upon subjection to the force of gravity migrate to various levels or phases and are selectively withdrawn from their respective levels to effectively separate these components in an efficient and expeditious manner.

It is an object of this invention to alleviate the aforementioned difficulties in the art by providing a new and novel method and apparatus for the cleaning of metal waste such as chips and turnings and the like and the reclamation of oil carried by such waste.

It is also an object of this invention to provide such a method and apparatus wherein the combined operations of metal waste cleaning and the reclamation of oil may be accomplished in a simple, inexpensive manner requiring relatively little capital investment and incurring relatively low operating and maintenance expenses.

It is a further object of this invention to provide a new and novel method and apparatus wherein the moisture and oil content of the metal waste can be reduced to such a low level as to permit the direct feeding of the metal waste to a melting furnace or to allow the formation of commercially acceptable briquettes from said waste.

It is a further object of this invention, to provide such a method and apparatus for producing metal waste having a sufficiently low moisture and oil content for forming briquettes having a compressive strength of 10,000 pounds per square inch, a level believed to be unattainable by known commercial methods and apparatus.

Another object of this invention is to provide such a method and apparatus wherein optimum amounts of oil can be recovered from the solution in a relatively simple, inexpensive manner while the solution is being recirculated for repeated use in washing the metal waste.

It is also an object of this invention to provide such a method and apparatus employing a detergent wash solution of a strength sufficient to dissolve the oil carried by the metal waste and upon application of a force allow the rapid separation of the oil so that the oil and detergent solution may be efficiently separated as the detergent solution is being recirculated back to the wash bath.

It is a further object of this invention to provide such a new and novel apparatus for effecting the aforementioned objects including a waste washer comprised of an inclined drum and a spiral ribbon conveyor for effectively moving said waste through said drum while agitating said waste to effectively expose all surfaces of the waste particles to the solution to provide an increased cleaning capability.

Another object of this invention is to provide such an apparatus employing a settling basin in the solution recirculation circuit for effecting a separation of the oil and solution with a new and novel arrangement of a drag flight conveyor in said basin for effectively removing sludge and oil separately from said basin.

As a further object of this invention a solution recirculation circuit is provided wherein the oil and solution are separated by subjecting the solution carrying said oil to a centrifugal force to effectively remove the oil from the solution to both reclaim the oil and rejuvenate the detergent solution.

Other objects and advantages of this invention will become apparent from the following description taken in connection with the accompanying drawings wherein embodiments of this invention are set forth by way of illustration and example.

BRIEF DESCRIPTION OF THE DRAWINGS

FIG. 1 is a vertical, sectional view taken through a portion of the apparatus of this invention illustrating a metal waste washer, a detergent solution settling basin and a metal waste feeder.

FIG. 2 is a vertical, sectional view taken on line 2—2 of FIG. 1 showing the metal waste washer in section and an end view of the settling basin.

FIG. 3 is a vertical, sectional view taken on line 3—3 of FIG. 1 through the feeder, the washer and the settling basin.

FIG. 4 is a diagrammatic view showing the overall waste cleaning operation and a modified form of a metal waste feeder and a detergent solution recirculation circuit.

DETAILED DESCRIPTION

Method of cleaning metal waste and reclaiming oil therefrom

The method of cleaning metal waste products such as turnings, cuttings or metal chips and recovering oil therefrom embodying the features of this invention is basically comprised of the steps of crushing the metal waste, washing the crushed waste in a detergent solution, separating remaining moisture and oil from the washed waste, for instance subjecting the waste to a centrifugal force, and reclaiming the oil from the detergent solution by separating the oil from the solution as the solution is being recirculated for repeated use in the washing of the metal waste.

Initially, the metal waste may be crushed to provide smaller particles and uniformity of particle size. It is also desirable to filter the waste at the crusher in order to remove trash, bar ends and the like. Although the waste crushing operation enhances the cleaning and deoiling operation, it is not considered critical in all situations and therefore may be omitted particularly where the metal waste is comprised of relatively uniformly sized particles.

The washing of the metal waste is accomplished in a new and novel manner by creating a flow of a detergent solution in a first direction through a tank or other container to provide a wash bath for dissolving the oil carried by the metal waste. The flow is created in such a manner as not to create a foaming of the detergent solution. The metal waste is moved through the bath in a direction opposed to the direction of flow of said detergent solution to thereby provide a counterflow of metal waste and solution within the bath. During this counterflow, the metal is constantly agitated to expose all surfaces of the metal particles to the detergent solution.

Although the type of detergent employed may vary depending on the types of metal and oil encountered, solutions ranging between 2 percent and 10 percent by weight employed in the aforedescribed manner are effective in removing a substantial quantity of oil. In addition, detergent solutions of such strength allow the oil to separate from the detergent solution upon standing in a settling basin or upon the application of a force to said solution such as that encountered in centrifuge. Thus, in the context of this specification, the term dissolving as applied to the action of the detergent means that the detergent will carry away a substantial portion of the oil from the metal waste and allow substantial separation of the detergent solution and the oil during a substantially continuous recirculation of solution from, to and through the wash bath.

While one of ordinary skill in the art may select particular detergents for use with particular oils and metals, a solution employing "Oakite" No. 24 made by Oakite Products, Inc., of New York, alkaline detergent containing soap, silicates and caustic at a concentration of approximately 5%, has been found to provide desirable results with some metals particularly cast iron and steel. "Oakite" cryscote No. 187 made by Oakite Products, Inc., an acidic detergent containing phosphates, activating agents and solvents, at a concentration of approximately 3% has been found to provide the desired results with other metals particularly brass. Detergent cleaning solutions which may provide such desired results are set forth by example in the U.S. Pat. No. 3,322,573 issued May 30, 1967. The term "detergent solution" is defined for use herein as cleaning solutions containing detergents including built detergent solutions. Normally these solutions will have either an alkaline or acidic character depending upon the metals and oils encountered.

The retention time for metal chips within the wash bath may vary dependent upon the type of detergent employed and its concentration, preferable results have been obtained using the Oakite No. 24 at 180° F., at approximately 5% strength with a retention time in the washer of approximately two minutes with the feeding of metal waste to the washer being conducted at approximately 1750 pounds per hour while recirculating approximately 8100 pounds per hour of detergent solution. The retention time, however, may vary within the range of one to six minutes.

The recirculation and rejuvenation of the detergent solution is accomplished at a rapid rate maintaining a swift flow of detergent solution through the bath and minimizing the amount of detergent required. The recirculation rate is preferably in the neighborhood of 8100 pounds per hour. When using a 220 gallon settling tank, an evacuation of the settling tank occurs approximately five times per hour.

In order to maintain the detergent solution at the desired strength and in proper condition for dissolving a substantial quantity of oil, it is necessary to remove or separate the sludge and the oil and add detergent. It is particularly desirable to heat the detergent solution to obtain maximum efficiency in dissolving oil.

The separation of the oil and sludge and the heating of the detergent solution may all be accomplished simply by moving the detergent solution with the oil and sludge carried thereby to a settling basin and allowing the sludge and oil to separate. The oil rises to an upper level and the sludge normally sinks to a lower level providing a three phase settling system wherein the detergent solution generally occupies the center or middle phase. By providing such a simple separation process, the overall washing and oil reclaiming operation may be accomplished at a relatively low cost. The oil and the sludge are each continuously removed from their respective phases of the settling basin by equipment to be described later herein. It is also possible to simply remove the sludge from the detergent as it is being transferred to the settling basin by filtering the detergent solution. The detergent solution with its associated oil may then be placed in a settling basin.

Irrespective of the method of sludge removal, the oil of the upper phase of the settling basin may be passed through a liquid separator to effect a further separation of the detergent solution from the oil whereupon the solution may be returned to the settling basin for recirculation to the wash bath.

After washing, the metal waste is removed from the wash basin and remaining moisture and oil separated therefrom in numerous manners. For example, the waste may be heated to evaporate moisture and oil therefrom. It has been found to be particularly advantageous to subject such washed metal waste to a centrifugal force as in an extractor to force a large quantity of the moisture and remaining oil from the waste. By this new and novel combination of detergent washing to a centrifugal force, unusual and heretofore unknown results in the art have been produced. The waste product cleaned by this process has a sufficiently low content of moisture and oil as to allow the direct feeding of the metal waste to various types of melting furnaces or the compression of the waste into briquettes having compressive strengths believed previously unattainable by known commercial processes and apparatus.

APPARATUS

The aforedescribed process is conducted by a new and novel combination of elements in a new and novel cooperative arrangement whereby each of these elements contribute to the overall efficiency of the process and the optimum results obtained thereby. Referring to FIG. 1, a portion of a system for cleaning metal waste and reclaiming the oil carried by said waste, embodying the features of this invention, is illustrated and is broadly designated by the reference numeral 1. The portion of system 1 is illustrated in FIG. 1 broadly includes a metal waste feeder illustrated as a waste feeder 2, a metal waste washer 4, and a detergent solution recirculation circuit 6. An extractor assembly 8, although only illustrated in FIG. 4, may also be included in system 1. A suitable washer operatively associated with metal waste washer is illustrated in the system of FIG. 4. The extractor 8 is illustrated as a centrifugal extractor of the type disclosed in the U.S. Pat. No. 2,906,466, issued Sept. 29, 1959 to Hopper and is disposed in cooperative relation with the washer 4. The overall combination of both illustrated systems may also include a metal waste crusher and trash filter as is illustrated in FIG. 4.

Metal waste feeder

Referring to FIG. 1, the metal waste feeder 2 includes a hopper 10 mounted in cooperative relation to a conventional screw feeder 12. The screw feeder 12 is controllably driven by the motor 14 through a variable speed gearing system 16 whereby the speed of rotation of the screw may be selectively adjusted in order to vary the feed rate of the metal waste to the washer 4.

Metal waste washer

The metal washer 4 is generally comprised of a longitudinally extending drum or tank 18 and a spiral ribbon conveyor 20 operatively mounted within the tank 18. Referring to FIGS. 2 and 3, the drum 18 is generally U-shaped having a pair of opposed spaced leg members 22, an arcuately shaped base portion 24 and a pair of end members 25 (FIG. 1). The base portion 24 conforms in shape generally to that of the spiral ribbon type conveyor 20.

The spiral ribbon type conveyor 20 is disposed longitudinally of the drum 18 and is conventionally comprised of a rotatably driven central shaft 26 and a spiral ribbon flight 28 operatively carried by said shaft 26. As illustrated, the shaft 26 is driven at selective speeds by the engine 30 through a variable speed transmission 32.

The drum 18 and the spiral conveyor 20 are longitudinally inclined to provide a washer 4 having a lower input end 32 and an upper discharge end 34 at a spaced elevation above end 32. The U-shaped drum 18 has an open top for receipt of metal waste from the feeder 2 at the input end portion 32. As illustrated, the screw feed 12 is simply disposed in spaced relation above end 32 whereby the metal waste fed from the screw feed 12 falls by gravity into the drum 18. The waste is then fed upwardly by the conveyor 20 to the discharge end portion 34 where the washed waste is passed through a discharge port 36 to the extractor 8 or a dryer. The spiral conveyor 20 has been found to be particularly suitable for the movement of waste through the detergent solution bath. In addition to moving the waste through the bath, the conveyor 20 provides an extremely active agitation of the waste to effectively expose all surfaces of the individual waste particles to the detergent solution.

Referring to FIGS. 1 and 2, the detergent solution is introduced to the washer 4 through the open top of the drum 18 by a slotted pipe 38 which extends across the top of the drum 18. The pipe 38 defines a slot 40 elongated transversely of the longitudinal drum 18 through which a falling curtain of detergent is expelled from pipe 38 as illustrated in FIG. 2, and indicated by dash lines in FIG. 1. The curtain is designated by the reference numeral 42. After introduction to the drum 18, the solution moves by gravity through the drum to the waste input end portion 32 to provide a wash bath of detergent solution 44 between the point of introduction of the solution and the end member 25 at the input end portion 32. The continued introduction of detergent solution into the drum 18 finally results in the flow of the detergent solution over the top of the end member 25 of the input end portion 32 to a catch basin 46. The detergent solution and the sludge and oil carried by said solution is passed through the recirculation circuit 6. As the operation is in process, there is a continuous flow of solution from the pipe 38 into the drum 18, a continuous overflow of solution from the tank 18 into the catch basin 46 for movement through the recirculation circuit 6.

Recirculation circuit

The detergent solution recirculation circuit 6 is designed to provide a continuous recirculation of detergent solution to and from the washer 4 while reconditioning the detergent solution and reclaiming the lubricating oil which the solution has dissolved and carried from the wash bath 44. As illustrated, the detergent solution passes by gravity from the catch basin 46 through a vertical pipe 48 to a tank 50 defining a settling basin 52. In the settling basin 52, the sludge carried by the detergent solution tends to sink to form a lower settling phase. The oil dissolved in the detergent solution in the washing basin 44 rises to form an upper settling phase. The detergent solution itself forms a middle or center phase in the settling basin 52. Thus, by employing a detergent solution of a predetermined strength sufficient to dissolve the oil being carried by the metal waste for carrying that oil from the wash basin 44 and which will also allow a rapid separation of the oil upon standing for a brief period permits the employment of a relatively simple, maintenance free, means for effecting the desired separation.

Referring to FIGS. 1 and 2, the settling tank 50 includes a pair of opposed side walls 54 and 56 interconnected by end walls 58 and 60 and a bottom member 62. The end wall 60 is inclined upwardly and outwardly from the bottom member 62 to define an inclined ramp along which the sludge from the lower phase of the settling basin 52 may be transferred in order to remove the sludge from the settling basin 52.

The end wall 58 has an upper surface 64 at an elevation lower than the upper surfaces of the side walls 54, 56 and the end wall 60. The upper oil phase overflows the upper surface 64 of end wall 58 and is received in an oil removal trough 66. The oil removal trough 66, as illustrated, is mounted to the wall 58 and extends across the basin from the side wall 54 to the side wall 56 and outwardly therefrom to a discharge end portion represented by the numeral 68. The trough 66 has a member 70 defining a lower surface inclined to the horizontal downwardly towards the discharge end portion 68 whereby the oil will flow through the trough 66 to the end portions 68 and from the trough through a discharge port 72 to an oil collector 74.

The oil and sludge which tend to rise and fall respectively in the settling basin 52 are removed from the settling basin 52 by a drag flight conveyor 76 operatively mounted within the tank 50. Referring to FIG. 3, the drag flight conveyor 76 is comprised of a pair of transversely spaced sets of sprocket wheels 78 each rotatably mounted on a respective shaft 80 in a conventional manner and a pair of transversely spaced chain members in conventional engagement with the respective sets of sprocket wheels 78. The chain members 82 are interconnected by a plurality of L-shaped drag elements 84 which extend transversely across the basin 52 having one leg member 86 mounted at each of its opposed end portions to the respective chain members 82 with the other leg member 88 extending outwardly to provide a pushing surface 90 for movement of the oil or sludge from the settling basin 52. As illustrated, the conveyor 76 is operatively driven by an engine 92 through a variable speed transmission 94 and a belt drive assembly 96 in a conventional manner.

The conveyor 76 includes an upper run 98 disposed in the upper oil phase of the settling basin 52 whereby the drag elements 84 push the oil longitudinally across the basin 52 and over the upper surface 64 of the end wall 58 to the oil trough 66. The conveyor 76 further includes a lower or return run extending through the lower phase of the settling basin 52 with the outstanding leg member 88 of the drag elements 84 moving generally along the bottom member 62 and the inclined wall 60 to move the sludge from the lower phase up the side wall 60 and over the top edge of the inclined wall 60 into a hopper or funnel structure 102 for passage to a sludge collector 104.

As the sludge and oil are separated from the detergent solution in the settling basin 52, the detergent solution may be withdrawn from the basin 52 and returned through the pipe 38 to the wash bath 44 in the manner previously discussed. Pump 106 is operatively mounted in the flow pipe 38 to lift the solution from the settling basin 52 to its level of discharge through the slot 40 in the pipe 38. As the removal of sludge and oil will diminish both the quantity of detergent solution within the system and its strength, a detergent make up line 108 is provided for supplying the settling basin with additional detergent solution. The quantity and quality of the detergent solution being circulated through the wash basin 44 may therefore be controlled by the addition of predetermined quantities of solution at a predetermined detergent strength.

It is desirable to heat some detergent solutions to various levels in order to effect a maximum cleaning action on the metal waste. This may be accomplished by providing a heating unit in the settling basin, such as that illustrated in FIG. 1 and designated by the reference numeral 110. The illustrated heating unit 110 is a hot air heat transfer unit comprised as shown in FIGS. 2 and 3 of a burner 112, heat transfer piping 114 disposed in the basin 52, and a hot air discharge system 116.

A modified form of a detergent solution recirculation circuit is illustrated in FIG. 4 and is broadly designated by the reference numeral 120. In the solution recirculation circuit 120, a solution discharge line 122 operatively connects the washing unit 4 to a sludge remover illustrated herein as solids filter 124. The filter 124 is then operatively coupled to a settling basin 126 by a flow line 128. Thus, in the modified circuit 120, the sludge is removed prior to the disposition of the detergent solution in the settling basin. Within the settling basin 126, the oil tends to rise to an upper phase and can be withdrawn therefrom through a line 128 to a liquid separator 130. The liquid separator 130 may be of a conventional centrifuge type. The oil so separated is transferred through a line 132 to storage. The detergent solution is then returned to the settling basin 126 through a line 134 by means of a pump 136. The detergent solution within the settling basin 126 is then pumped through the return line 138 by pump 140 for redisposition in the washing unit 4 in the manner described in relation to the embodiment disclosed in FIGS. 1, 2 and 3. The settling basin 126 is also provided with a heating unit 142 of the nature of that previously described.

Referring to FIG. 4, a chip feeder 148 is illustrated including a chip crusher and trash filter 150 and a chip conveying system 152 which is disposed in cooperative relation to the input end portion 32 of the washing unit 4. The conveying system 152 includes a bucket elevator 154 and a screw feeder 156. The screw feeder 156 is employed for moving the chips from the crusher 150 to the bucket elevator 154. The bucket elevator 154 elevates the chips above the input end portion 32 of the washing unit 4 to provide a gravity feed to the drum 18 through a feed spout 158.

A hopper 160 is disposed in cooperative relation with the discharge port 36. The hopper 160 receives the washed waste from the port 36 and passes the chips by a screw feeder 162 to the extractor assembly 8. The extractor subjects the waste to a centrifugal force and then drops the waste out of the bottom of the extractor 8 for movement through a discharge circuit 164.

OPERATION OF THE APPARATUS

Referring to FIG. 1, a metal waste such as metal chips is fed through the feeder 2 to the input end portion 32 from the washer 4 and is carried through the drum 18 and the wash bath 44 to the discharge port 36 by means of the spiral ribbon conveyor 20.

The detergent solution is introduced into the washer 4 through the slotted pipe 38 to provide a descending curtain of detergent 42 slightly interiorly of the discharge port 36. The detergent solution then flows by gravity through the inclined drum 18 in a counterflow direction to the movement of the metal waste overflowing the end wall 25 of the drum 18 into the catch basin 46. Exceptional results have been obtained from the washing or scrubbing action acquired by the counterflow of waste detergent solution with the agitation of the metal waste by the action of the spiral conveyor 20.

The detergent solution is then passed through a recirculation circuit 6 in which oil and sludge are separated therefrom. The detergent solution may be heated if desired and additional makeup detergent supplied in order to maintain the detergent strength at the desired level. In the embodiment illustrated in FIG. 1, the detergent soltuion is passed through a vertical pipe 48 and into a tank 50 to form a settling basin 52. Upon standing, the sludge and oil form lower and upper phases respectively, in the settling basin 52.

The oil forming the upper phase of the settling basin overflows into an oil trough 66 with the upper run 98 of the drag flight conveyor 76 pushing the oil across the settling basin 52 to trough 66. The oil flows ultimately to an oil collector 74. The lower run 100 of the conveyor 76 moves through the lower sludge phase of the settling basin 52 with the drag elements 84 pushing the sludge along the bottom member 62 and the inclined end wall 60 to the funnel structure 102 for ultimate disposition in the sludge collector 104.

The detergent solution occupying the middle of center phase of the settling basin 52, is heated in the tank 50 by the heating elements 110. As the detergent solution tends to lose strength and quantity as a result of the washing operation and the separation of the sludge and oil from the settling basin 52, the detergent makeup 108 is employed re-supplying detergent solution to the system in order to maintain both the quantity of the solution and the detergent strength at the desired level. The solution is then moved through the pipe 38 by means of a pump 106 for recirculation through the washer 4.

Referring to FIG. 4, the modified detergent solution recirculation circuit 120 employs a solids filter 124 in the line between the washer 4 and the settling basin 126 in order to remove the sludge from the detergent solution prior to the separation operation effected by standing in a settling basin 126. The oil tends to occupy most of the upper six inches of the settling basin 126 and may therefore be withdrawn to a liquid separator 130 such as a centrifuge which can effect a final separation of the oil from any detergent solution. The separated detergent solution is returned to the settling basin through line 134 for ultimate recirculation through line 138 to the washer 4. The detergent solution may be heated by the heating elements 142 in the settling basin 126. A makeup detergent solution is provided in the settling basin 126 in the manner discussed in relation to basin 52.

In each of the aforedescribed systems, the waste removed from the washer 4 through the discharge port 36 is passed to the extractor 8 (not shown in FIG. 1). The extractor 8 imposes a centrifgual force on the waste tending to remove that moisture acquired in the washing operation and also remaining oil in order to effectively reduce the moisture and oil content to a point below the level at which the metal waste may be directly fed to melting furnaces or compressed into briquettes of compressive strengths believed unattainable by known commercial techniques. In the illustrated embodiment, the metal waste passes from the extractor 8 through a discharge system 164.

It is to be understood while I have illustrated and described two preferred forms of my invention, it is not to be limited to the specific forms or arrangements of parts herein described and shown. The scope of the invention is to be determined by the claims.

I claim:

1. A continuous non-batch type process for cleaning metal waste and reclaiming the oil carried by said waste including the steps of:
    (a) creating a flow of a detergent solution in a first direction to provide a wash bath for cleaning said metal waste by submersion in said detergent solution and dissolving the oil carried by said waste;
    (b) moving said metal waste through the flowing detergent solution of said bath in a direction generally opposite to the direction of flow of said solution to provide a counterflow of waste and solution;
    (c) agitating said waste as the waste is moved through said bath in order to expose all surfaces of the individual metal particles comprising said waste to the detergent solution;
    (d) removing the detergent solution from the bath after its exposure to the metal waste and sending the detergent solution through a recirculation circuit including a settling basin, said solution carrying sludge and oil therewith;
    (e) removing sludge from the solution and the recirculation circuit;
    (f) allowing the detergent solution to stand in said settling basin, said oil separating from said solution and rising to form an upper phase, and removing said upper oil phase separately from said basin;
    (g) heating the detergent solution to a desired level;
    (h) adding make up detergent solution to the recirculated detergent solution, said make up solution having a concentration greater than the concentration of the detergent solution employed in the washing operation of an amount sufficient to maintain the detergent solution in the wash bath at the desired predetermined concentration level; and,
    (i) returning the detergent solution to the wash bath.

2. A process for cleaning metal waste and reclaiming oil carried by said waste as recited in claim 1 wherein said detergent concentration is in the range of two percent solution by weight to ten percent solution by weight.

3. A process for cleaning metal waste and reclaiming oil carried by said waste as recited in claim 1 wherein the detergent solution removed from the bath is allowed to stand in said basin to effect the separation of the oil, sludge and detergent solution into upper, lower and middle phases respectively, removing the upper oil phase separately from the basin, removing the lower sludge phase separately from the basin and recirculating the detergent solution back to the metal waste wash bath for movement therethrough.

4. A process for cleaning waste and reclaiming oil carried by said waste as recited in claim 1 wherein the sludge is filtered from the detergent solution after its removal from the wash bath, the oil and detergent solution are allowed to stand to effect a separation of the oil and solution into upper and lower phases respectively, the upper oil phase is removed separately and, the lower detergent phase is recirculated back to the metal waste bath for movement therethrough.

5. A process for cleaning metal waste and reclaiming oil carried by said waste as recited in claim 1 wherein the metal waste is retained within the wash basin for a period of time in the range of one to six minutes.

6. A process for cleaning metal waste and reclaiming oil carried by said waste as recited in claim 1 including the further steps of removing the metal waste from the wash bath and separating a substantial quantity of the moisture and remaining oil from the metal waste.

7. A process for cleaning metal waste and reclaiming oil carried by said waste as recited in claim 6 wherein said moisture and remaining oil is separated from the metal waste by subjecting the metal waste to a centrifugal force.

8. A process for cleaning metal waste and reclaiming oil carried by said waste as recited in claim 6 wherein said moisture and remaining oil content is separated from the metal waste by transferring heat to said waste in order to evaporate said moisture and oil.

References Cited
UNITED STATES PATENTS

| | | | |
|---|---|---|---|
| 1,580,723 | 4/1926 | Hapgood | 134—10 |
| 1,743,466 | 1/1930 | Maag et al. | 134—10 |
| 2,714,574 | 8/1955 | Kearney | 134—25 XR |
| 3,163,929 | 1/1965 | Goodstein | 29—403 |

FOREIGN PATENTS

| | | |
|---|---|---|
| 808,901 | 2/1959 | Great Britain. |
| 967,010 | 8/1964 | Great Britain. |

MORRIS O. WOLK, Primary Examiner

J. T. ZATARGA, Assistant Examiner

U.S. Cl. X.R.

134—10